United States Patent
Stoecker et al.

(10) Patent No.: US 7,118,307 B2
(45) Date of Patent: Oct. 10, 2006

(54) COOLING WATER INTAKE SYSTEM

(75) Inventors: Roy R. Stoecker, Babylon, NY (US); Leland M. Hairr, Huntington, NY (US)

(73) Assignee: EEA Inc., Garden City, NY (US)

( * ) Notice: Subject to any disclaimer, the term of this patent is extended or adjusted under 35 U.S.C. 154(b) by 0 days.

(21) Appl. No.: 10/669,798

(22) Filed: Sep. 24, 2003

(65) Prior Publication Data

US 2005/0063782 A1    Mar. 24, 2005

(51) Int. Cl.
F24J 3/08    (2006.01)

(52) U.S. Cl. .......................... 405/50; 405/43; 165/45; 62/260; 210/170; 210/747

(58) Field of Classification Search ................. 405/43, 405/47, 48, 50; 60/641.1, 641.7; 210/747, 210/170; 165/45; 62/260
See application file for complete search history.

(56) References Cited

U.S. PATENT DOCUMENTS

| | | | | |
|---|---|---|---|---|
| 3,627,646 A | | 12/1971 | Osdor | 202/93 |
| 3,950,958 A | * | 4/1976 | Loofbourow | 62/53.1 |
| 3,978,663 A | | 9/1976 | Mandrin et al. | 60/728 |
| 4,009,082 A | | 2/1977 | Smith, Jr. | 203/11 |
| 4,319,648 A | * | 3/1982 | Cherrington | 175/53 |
| 4,448,237 A | * | 5/1984 | Riley | 165/45 |
| 4,476,921 A | * | 10/1984 | Stubbolo | 165/48.1 |
| 4,553,585 A | | 11/1985 | Pfleger et al. | 165/41 |
| 5,014,660 A | | 5/1991 | Westerbeke, Jr. | 123/198 E |
| 5,183,100 A | * | 2/1993 | Harrell, Jr. | 165/45 |
| 5,277,829 A | | 1/1994 | Ward | 210/792 |
| 5,902,488 A | | 5/1999 | Prince | 210/747 |
| 6,089,022 A | | 7/2000 | Zednik et al. | 60/641.7 |
| 6,095,719 A | | 8/2000 | Miya et al. | 405/127 |
| 6,202,753 B1 | | 3/2001 | Baugh | 166/364 |
| 6,367,258 B1 | | 4/2002 | Wen et al. | 60/641.7 |
| 6,422,318 B1 | * | 7/2002 | Rider | 166/380 |
| 6,450,247 B1 | * | 9/2002 | Raff | 165/45 |
| 6,484,794 B1 | * | 11/2002 | Schulak et al. | 165/45 |
| 6,536,215 B1 | | 3/2003 | Vikstrom | 60/641.1 |
| 6,673,249 B1 | | 1/2004 | Max | 210/747 |
| 6,904,967 B1 | * | 6/2005 | McLaughlin | 165/201 |
| 7,032,649 B1 | * | 4/2006 | Schulak et al. | 165/45 |
| 2003/0121641 A1 | * | 7/2003 | Schulak et al. | 165/45 |

OTHER PUBLICATIONS 10 webpages downloaded from the website (wwww.Ranneymethod. com) of the Ranney Division of Reynolds-Ohio, 6063 Frantz Road, Suite 206, Dublin, Ohio 43017.

Synthesis Paper-Management Practices For Feedwater Intakes and Concentrate Disposal For Seawater Desalination (unknown date), pp. 1-14, website at: http://www.owue.water.ca.gov/recycle/desal/Docs/ManagementPracticesIntake_Disposal.doc.

Lovo, R., Initial Evaluation of the Subfloor Water Intake Structure System (SWISS) vs. Conventional Multimedia Pretreatment Techniques—Pacific Research Group, Ventura, California, Desalination Research and Development Program Report No. 66, May 2001 pp. 1-58.

(Continued)

*Primary Examiner*—Meredith C. Petravick
*Assistant Examiner*—Tara L. Mayo
(74) *Attorney, Agent, or Firm*—Dilworth & Barrese, LLP

(57) ABSTRACT

A cooling water intake system is configured to minimize entrainment, impingement and thermal plumes associated with the operation of onshore industrial facilities, such as a power plant, and includes a delivery system guiding ground waters from under the sand bottom of the water reservoir including oceans, seas, lakes and rivers to the industrial facilities.

8 Claims, 2 Drawing Sheets

OTHER PUBLICATIONS

Pacific Research Group, Ventura, California, Initial Evaluation of the Subfloor Water Intake Structure Systems (SWISS) vs. Conventional Multimedia Pretreatment Techniques, May 2001 Report No. 66—Exective Summary, p. 1.

Business & Economy, Quenching a Global Thirst—Jun. 26, 2003, pp. 1-3.

The Desalination and Water Purification Research & Development Program Newsletter—No. 20, Summer 2001, pp. 1-3.

Zidouri, H., Desalination in Morocco and Presentation of Design and Operation of the Laayoune Seawater Reverse Osmosis Plant, Proceedings of the Conference on Membranes In Drinking and Industrial Water Production, vol. 1, pp. 293-301, Oct. 2000.

* cited by examiner

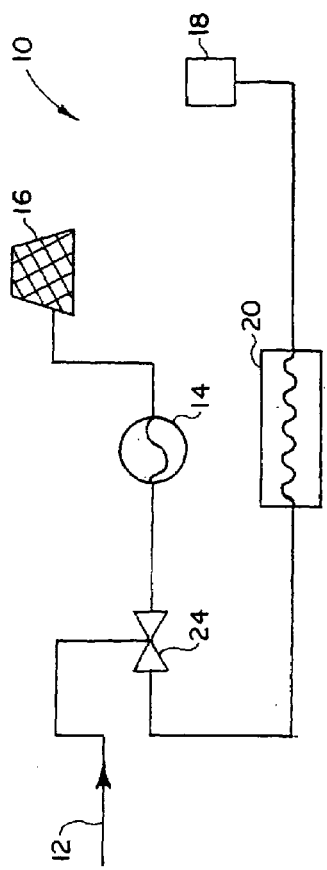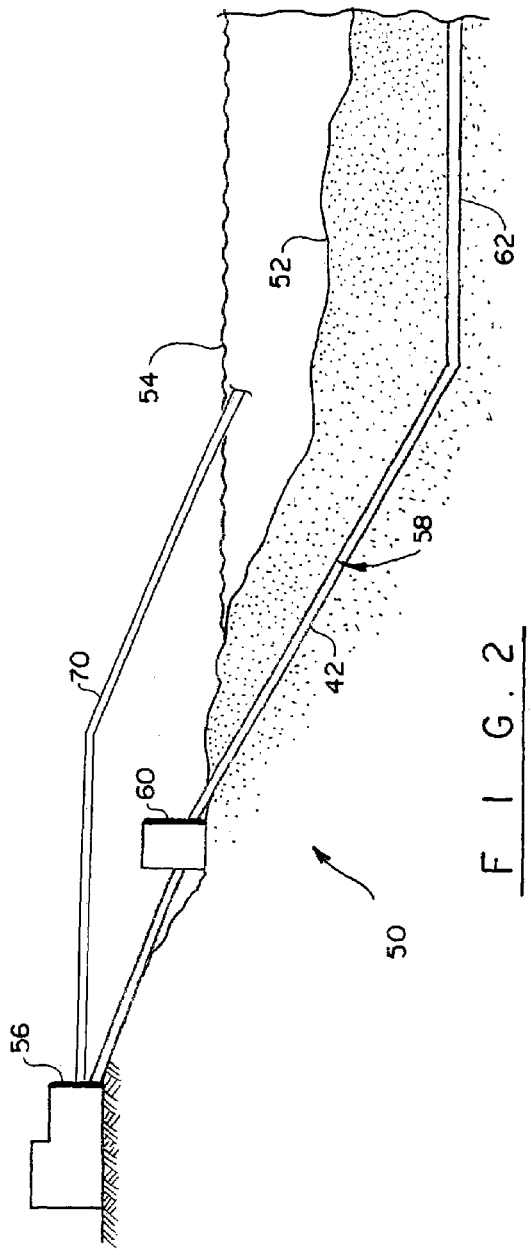

COOLING WATER INTAKE SYSTEM

BACKGROUND OF THE INVENTION

1. Field of the Invention

The invention relates to a method and system for delivering ground waters from under the bottom of water reservoirs for cooling equipment of onshore facilities.

2. Discussion of the Prior Art

A variety of industrial facilities generating or consuming electric energy necessarily use a cooling medium for providing proper functioning of the facilities' equipment. For example, steam power plants, typically generating electric energy, operate with a cooling medium such as a water/steam mixture, carried in an evaporator circuit of the steam power plant. The steam generated in the process expands to perform work in the steam turbine of the steam power plant and is subsequently fed to the condenser for producing a working medium. The latter is normally condensed by heat exchange with cooling water, which is fed directly to the condenser from a water reservoir, such as an ocean, sea, river or lake. This is known as an open cycle cooling system, or simply, open system.

Utilization of an open system operating with ambient surface waters for cooling purposes produces a variety of negative environmental impacts to the local receiving waters. For example, the massive volumes of water circulated through a large facility absorb heat from the condensers, typically raising the circulating cooling water temperatures 15 to 20 degrees (F) within seconds. Depending on the water demands of the power plant, cooling water discharged from the facility causes thermal plumes of ambient water in the vicinity of the powerplant or other heat producing industrial facility. During summer months these plumes are sufficiently hot to kill or stun fish and invertebrates.

Furthermore, small aquatic organisms are entrained by the pumped-in influent water. Entrainment is a term for the process of sweeping planktonic organisms, including eggs and larval forms through the cooling system of a powerplant. The organisms are subject to mechanical (pumping) stresses, thermal effects and injection of biocides. Overall mortality of the organisms varies but is usually high, often approaching 100 percent. This mortality is thought to be a major factor in reduction of fish stocks in both fresh and saline waters.

Still a further disadvantage of the open-cooling systems is associated with impingement, which is the process whereby larger fish and invertebrates are sucked against the intake screens of a powerplant or forced against the sea floor. The water velocity prevents them from getting off the screens and they remain there until the screens are backwashed. Impinged fish and invertebrates are often killed.

Also, facilities situated on saline waters periodically use biocides, such as chlorine, to control algae, which detrimentally affect organism growth. While much work has been done researching the effects of powerplants on aquatic biota, and numerous intake systems tested, the impacts still remain very much a problem.

The problems are so prevalent that regulatory agencies usually specify an alternate cooling system, such as cooling towers, even though these lessen the thermal efficiency of the powerplant or industrial facility. One such alternative cooling system for a power generation plant 10 is diagrammatically illustrated in FIG. 1 and, in principle, operates by directing steam 12 to a turbine 24 actuating its generator 14, which spins at high velocity generating electricity that is transmitted in the electricity grid 16. Since, as is well known, condensing improves turbine efficiency, power generation plants have at least one cooling tower 18 providing the power plant with a cooling medium, such as cold water typically delivered from a natural water reservoir for efficient operation of a condenser 20. The cooling system, as described immediately above, may be cost inefficient and may have the same problems as the traditional cooling system.

A need therefore exists for a method and system for providing a cooling medium to industrial facilities that retains the advantage of ambient water cooling while minimizing or even completely eliminating all adverse environmental impacts.

SUMMARY OF THE INVENTION

The present inventive system and method meet this need by replacing traditional surface water intake structures with an under sea bottom, river or lake bottom system capable of drawing ground waters through the sand substrate of the bottom into a delivery assembly.

The inventive concept can be implemented at any facility experiencing a need in a limitless and cost-efficient cooling medium and includes at least one screened pipe buried either by trenching or horizontal directional drilling under the sea, river or lake bottom to an appropriate depth. Further components of the inventive system include an on-ground manifold and pumping assembly coupled to the outlet of the screened pipe and a discharge assembly.

One of the advantages of the inventive system is the use of the seabed sand as a natural filter. Indeed, even before the water reaches the screened pipes, the sand would be able to reduce or eliminate any planktonic organisms entrained by the influent water. Furthermore, since the ground water reaching the plant is free or essentially free from planktonic organisms, there will be no need for biocides for encrusting organisms. The elimination of biocide injection is an environmental benefit for the system and a cost saving measure as well.

Additionally, assuming the well field is sufficiently large in area, the downward velocity gradient through the sand sea floor will be so low as to preclude any possibility of impingement of organisms on the sea floor above the well field.

Since the ground water underneath the surface waters is too deep to experience seasonal thermal variations, it remains at near constant temperature year round. For example, an average ambient water temperature in a region, such as the waters of Long Island, N.Y., is approximately 55° F. Assuming that cooling water experiences a temperature rise of 20 degrees while circulating through a cooling system of industrial facility, a release temperature of the discharged water during winter, early spring and fall months will not be sufficient to cause thermal plumes that is, greater than 75° F., which can negatively impact the aquatic environment. However, during summer months, the ambient water temperature may be higher than the above-indicated average water temperature, for example, 80° F. As a result, the temperature of the discharged water in accordance with the inventive concept during summer months may be the same or lower than ambient resulting in no thermal plume.

It is therefore an object of the present invention to provide an intake system that allows facilities to operate open cycle cooling systems without causing impacts on the indigenous biota.

Still another object of the invention is to provide a method for delivering ground waters from under a bottom of water reservoirs to industrial facilities.

BRIEF DESCRIPTION OF THE DRAWINGS

The above and other objects, features and advantages will become more readily apparent from the following detailed description accompanied by a set of drawings, in which:

FIG. 1 is a diagrammatic configuration of a typical prior art cooling system associated with a power plant;

FIG. 2 is a diagrammatic view of an intake system configured in accordance with the invention.

DETAILED DESCRIPTION

Figures 3, 4:
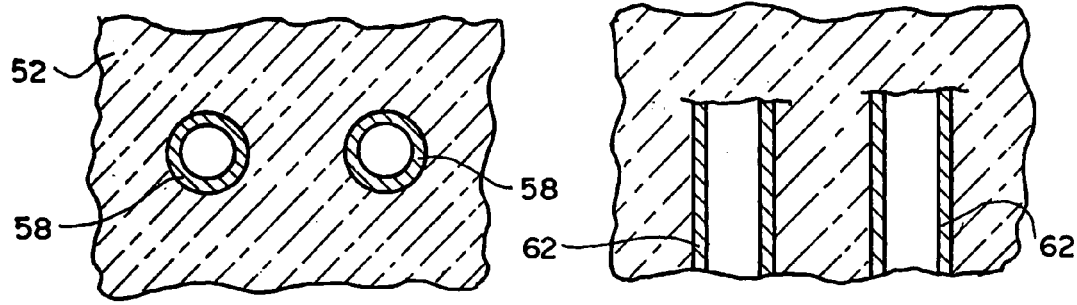
FIG. 3 is a cross-sectional view of one embodiment of the inventive cooling system having a plurality of water conveying pipes, which extend substantially horizontally under a bottom of water reservoirs.
FIG. 4 is a cross-sectional view of another embodiment of the inventive cooling system having a plurality of distal ends of water conveying pipes, which extend generally transversely to a horizontal under a bottom of water reservoirs.

Referring to FIG. 2, a cooling water system 50 is operative to deliver influent water from under a bottom 52 of a water reservoir 54 to an industrial facility 56 to transfer heat from equipment or processes therein. Although the cooling water system 50, as discussed here, is described in association with a power plant, a variety of facilities that may benefit from using a cooling water from under the bottom 52 and including, for example, nuclear plants and desalination plants, can utilize this system. The water reservoir 54 can be any body of water including oceans, seas, lakes and rivers subject only to a predominantly sandy substrate constituting the bottom 52. It is preferable for the most desirable operation of the cooling system that the bottom 52 be mostly sandy, as opposed to clay or rock, since the sand has a well-known and unique ability to filtrate incoming water.

Conveyance of water from under the bottom 52 to the facility is realized by a water delivery assembly including at least one pipe 58 and a pump station or house 60. Pipe(s) 58 can be buried preferably to depth ranging from about 25 feet to approximately 50 feet under the bottom 52 by numerous methods including trenching, horizontal directional drilling under the bottom 52 or shield tunneling. The latter utilizes a big cylinder-digging machine, which is called a shield, installed in the natural ground for construction of a tunnel.

The length and diameter of the pipes 58 will depend on the water quantity required by the particular facility. The pipes 58 have a distal end 62, which is spaced from the pump station 60 at the desirable distance for example, from near shore to about one (1) mile therefrom. Arrangement of the pipes 58 can include a variety of geometrical patterns. For example, one of the patterns includes parallel distal ends 62 coextending in a generally horizontal plane and terminating at a substantially uniform distance from the pump house 60, as shown in FIG. 3. Alternatively, the distal ends 62 may extend generally vertically to a horizontal, as illustrated in FIG. 4. Parallel juxtaposition of the pipes 58 can be replaced with a non-parallel arrangement, in which the distal ends 62 of the pipes 58 extend at an angle with respect to one another to address the specifics of the bottom topography and/or water temperature variations often observed even within a relatively small area.

Figure 5:
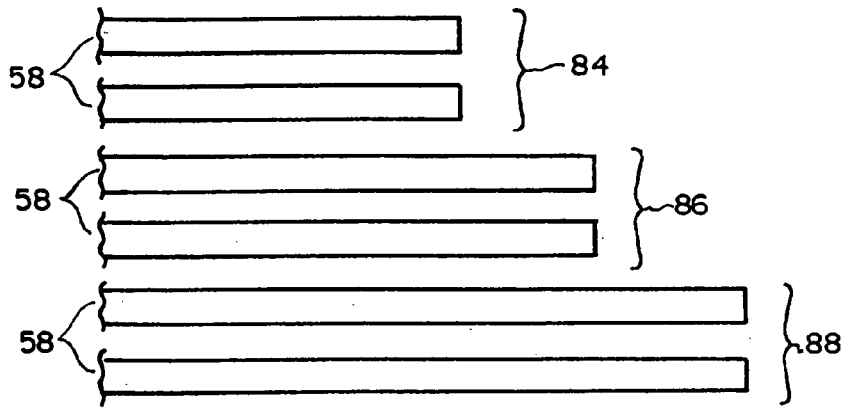
FIG. 5 is a diagrammatic top view of the inventive cooling system provided with a plurality of non-uniformly dimensioned water conveying pipes, which form a succession of pipe groups

While the arrangements of the pipes 58 described above include uniformly dimensioned pipes, FIG. 5 illustrates a horizontal arrangement including multiple pipe groups 84, 86 and 88, which have differently dimensioned pipes. Functionally, the first pipe group 84 of relatively short pipes can be used during winter months, whereas the progressively longer second 86 and third 88 pipe groups can be used during spring and autumn months and summer months, respectively. A vertical arrangement of differently sized pipes terminating progressively deeper from the seabed can be easily implemented as well. Having relatively short pipes may be advantageous during cold months when ambient air and surface water temperatures are low and do not substantially affect ground waters, which, thus, can be taken at a relatively short distance from shore. As the ambient air temperature rises, thus, warming the ground waters, the inventive system can utilize relatively long pipes 58 having the distal ends thereof buried deeper under the seabed than the distal ends of relatively short pipes.

A proximal end or portion 42 of the pipes 58 can extend under the bottom 52 of the water reservoir, as shown in FIG. 2. However, if desirable, the intake system may have the proximal ends 42 of the pipes 58 extend above the bottom and even above the water surface, while leaving the distal ends buried under the bottom 52.

Figures 6A, 6B:
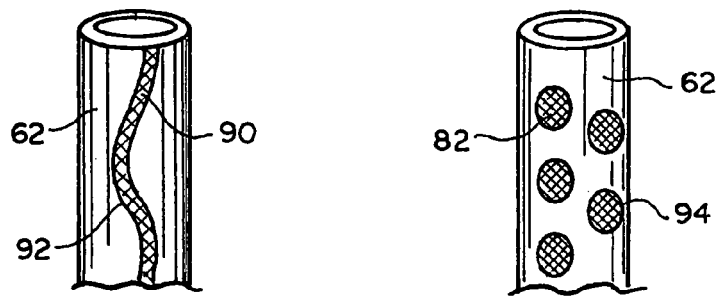
FIGS. 6A and 6B illustrate various embodiments of a filtrating assembly provided on water conveying pipes of the inventive cooling system.

Distal ends 62 of the pipes 58 are provided with a filtering assembly 80, as shown in FIGS. 6A and 6B. The filtering assembly 80 has variously dimensioned screens configured to filter ground waters from solid particles to avoid pipeline sediment incursion. Typically, on Long Island with medium sands, well screens are usually 20 slot or 0.020 inches (0.5 mm) screen size. The well screens associated with the distal portions 62 of the pipes can include woven wire screencloths precrimped to the desirable size of the apertures. Another configuration of the filtering assembly may include woven wire mesh. Typically, woven wire mesh is used for finer screening applications. Wires may be made from stainless steel or brass. The size of the apertures and the grade of screen perforations are controlled so as to prevent sand from entering the system where it can cause pump wear and even eventual well failure.

The use of the screens allows the influent water to enter the well more easily minimizing, thus, energy and costs. Water enters at lower velocity, which, in turn, reduces erosion of the screen surfaces. Finally, the influent water also undergoes less pressure drop, reducing mineral precipitation, which can cause encrustation on the screen surface. Alternatively, the screens can include slotted pipes, louvered screens or perforated pipes.

A variety of factors should be taken into account when considering sub-sand abstraction, which among others include depth, extent and texture of the bottom (bed): i.e. its particular size pattern and stratification, which may vary widely both up and down and along the beach. While considerable modification may be possible, these three, separately or together, normally set a limit to the volume that can be drawn from any site and the selection of the screen.

Figure 7:
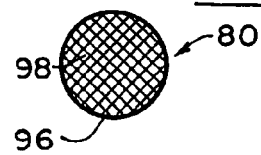
FIG. 7 is an end view of a water conveying pipe provided with a filtration assembly.

The geometry of the filtering assembly 80 depends on a shape and dimension of openings formed in the distal ends 62 of the pipes 58. As illustrated in FIG. 6A, the distal end 62 is provided with an elongated helical slot 90 covered by a screen 92. Alternatively, a plurality of linear slots (not shown) can be recessed in the pipes and each is covered by a respective screen. A further configuration of the filtering assembly is shown in FIG. 6B illustrating the distal pipe end 62 having a plurality of uniformly or non-uniformly sized and shaped openings 82, each of which is covered by a respective screen 94. In addition, as shown in FIG. 7 terminal ends 96 of the pipe end portion 62 can be provided with the same type of screens as disclosed above or may have a specifically designed membranes, such as a reverse osmosis membrane 98. These membranes are made typically of special polymers, such as certain polyamides, and have a spiral configuration provided with extremely small holes.

Location of the pump station 60 and the pumping rate are subject to specific requirements of any given facility and can be constructed on a shore or under water. Numerous types of pumps including, for example, turbine pumps, suction lift self-priming centrifugal pumps, or high head submergible pumps can be successfully utilized with the system 50.

Finally, water collected and circulated through the industrial facility 56 is passed through a discharge canal (or pipe) 70 and sent back into the local receiving waters.

Accordingly, among the advantages of abstracting water taken from under the bottom of the water body and filtered through the sand include:
  practically uniform temperature of influent water all year round;
  absence of sea weed and debris;
  exclusion of all stages of all species of plankton, including those such as mussels and sea squirts which are able to colonize pipelines and also the organic particles on which they filter-feed;
  no pipe fouling and no need to provide for routine cleaning;
  no impingement of larger fish and invertebrates; and
  no summer season thermal plumes.

It will be understood that various modifications may be made to the embodiments disclosed herein. Therefore, the above description should not be construed as limiting the scope of the invention, but merely as exemplifications of the preferred embodiments. Those skilled in the art will envision other modifications within the scope and spirit of the claims appended hereto.

What is claimed is:

1. A method for delivering cooling water to a power plant having condensers, the proper functioning of which require cooling, said method comprising the steps of:
  (i) extending a first pipe group of an open loop geothermal heat exchange system comprising at least one first pipe having a proximal end and a distal end substantially horizontally under the bottom of a water reservoir for a first predetermined distance from the shore of said water reservoir and for a first predetermined depth under the bottom of said water reservoir, said bottom constituting a predominantly sandy substrate;
  (ii) extending a second pipe group of the open loop geothermal heat exchange system comprising at least one second pipe having a proximal end and a distal end substantially horizontally under said bottom of said water reservoir for a second predetermined distance from the shore of said water reservoir and for a second predetermined depth under said bottom of said water reservoir, said second predetermined distance and depth being different from said first predetermined distance and depth;
  (iii) delivering ground water from under the bottom of said water reservoir to said power plant for cooling said condensers by inducing a low downward velocity gradient over the distances and depths of the first and second pipe groups and creating a negative pressure along the proximal ends of at least one of the first and second pipes sufficient to draw ground water from under the bottom of the water reservoir through said predominantly sandy substrate and into at least one of the first and second pipes through a filtering assembly associated with said first and second pipes and drawing ground water essentially free from planktonic organisms into said at least one of the first and second pipes;
  (iv) cooling said condensers with the delivered cooling water; and
  (v) discharging the cooling water from said power plant into the water reservoir at temperatures substantially preventing detrimental plumes, wherein heat conduction between the supply and discharge water is prevented by the sandy substrate which acts a natural thermal barrier.

2. The method of claim 1 wherein said first pipe group comprises a plurality of individual pipes of substantially the same length and said second pipe group comprises a plurality of individual pipes of substantially the same length but of a different length than the individual pipes of said first pipe group.

3. The method of claim 1 wherein said filtering assembly includes screens.

4. The method of claim 1 wherein said water reservoir is a water body selected from the group consisting of an ocean, sea, river, and lake.

5. An open loop geothermal heat exchange system comprising a delivery assembly configured to deliver cooling ground water under the bottom of a water reservoir to a power plant having condensers, the proper functioning of which require cooling, the delivery assembly comprising:
  (i) a first pipe group comprising at least one first pipe having a proximal end and a distal end extended substantially horizontally under the bottom of said water reservoir for a first predetermined distance from the shore of said water reservoir and for a first predetermined depth under the bottom of said water reservoir, said bottom constituting a predominantly sandy substrate;
  (ii) a second pipe group comprising at least one second pipe having a proximal end and a distal end extended substantially horizontally under said bottom of said water reservoir for a second predetermined distance from the shore of said water reservoir and for a second predetermined depth under said bottom of said water reservoir, said second predetermined distance and depth being different from said first predetermined distance and depth, wherein a low downward velocity gradient is induced over the distances and depths of the first and second pipe groups;
  (iii) a pump assembly in flow communication with the proximal ends of said first and said second pipes and configured to create a negative pressure along the proximal ends of said first and second pipes sufficient to draw ground water from under the bottom of the water reservoir through said predominantly sandy substrate and into said first and second pipes through a filtering assembly associated with said first and second pipes, and deliver said ground water free from planktonic organisms to said condensers for cooling thereof; and (iv) means for discharging the delivered ground water to said water reservoir after cooling said condensers without causing detrimental thermal plumes, wherein heat conduction between the supply and discharge water is prevented by the sandy substrate which acts a natural thermal barrier.

6. The cooling water intake system of claim 5, wherein said first pipe group comprises a plurality of individual pipes of substantially the same length and said second pipe group comprises a plurality of individual pipes of substantially the same length but of a different length than the individual pipes of said first pipe group.

7. The cooling water intake system of claim 5 wherein said filtering assembly includes screens.

8. The cooling water intake system of claim 5 wherein said water reservoir is selected from the group consisting of an ocean, sea, river, and lake.

* * * * *